July 7, 1970   JAN-THEODOR OLINK   3,519,412
APPARATUS FOR MELTING AND REFINING GLASS
Filed April 10, 1967   4 Sheets-Sheet 1

INVENTOR
JAN-THEODOR OLINK

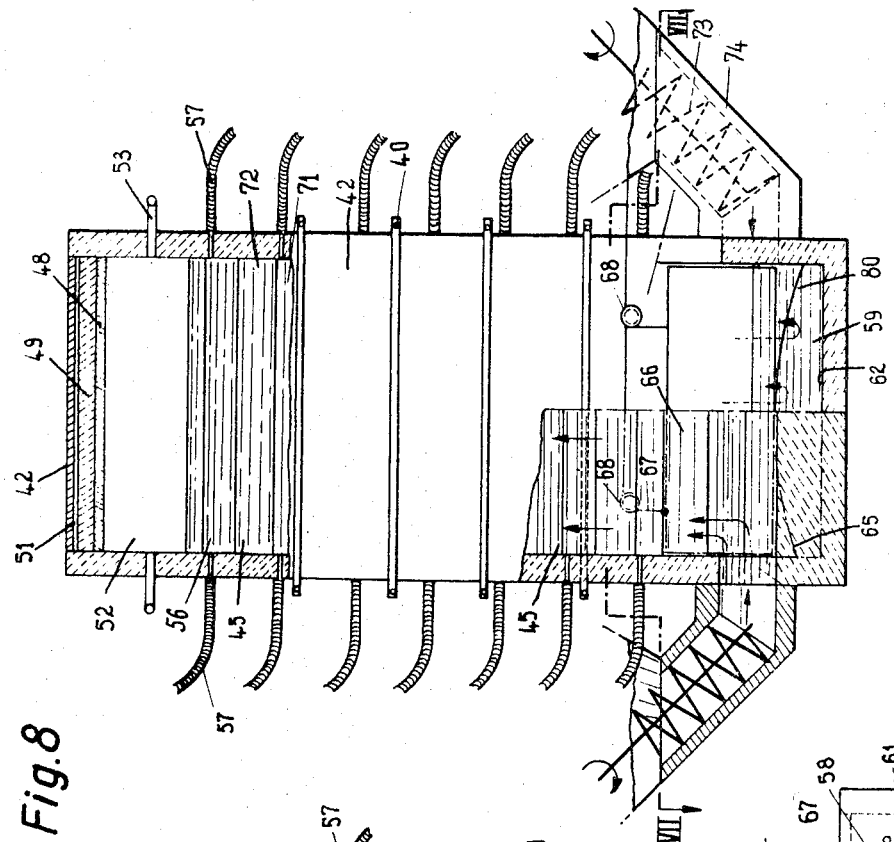
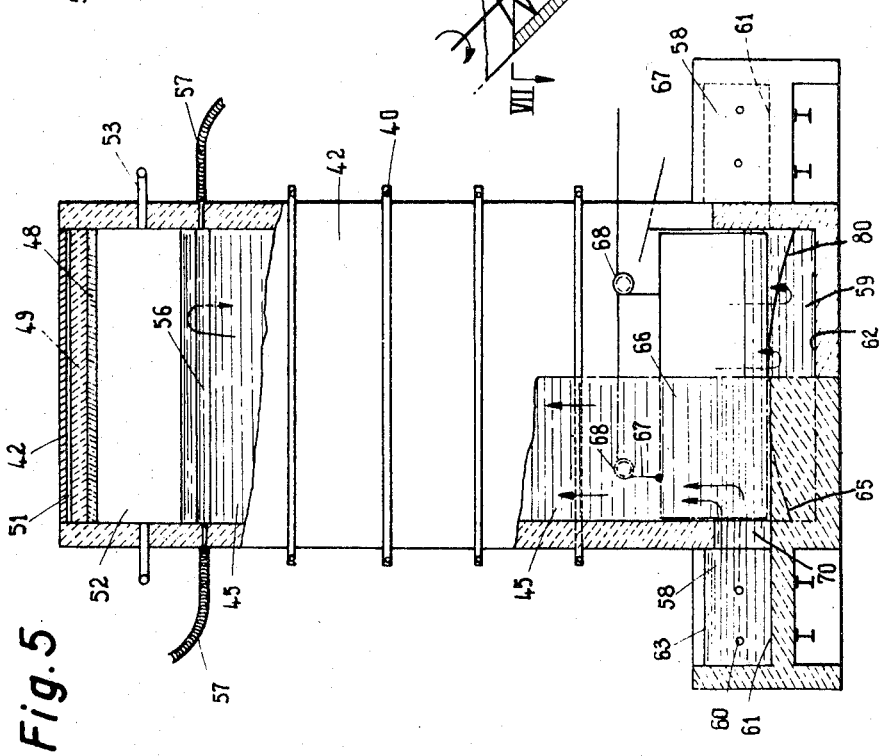

United States Patent Office 3,519,412
Patented July 7, 1970

1

3,519,412
APPARATUS FOR MELTING AND
REFINING GLASS
Jan-Theodor Olink, Asnieres, France, assignor to Boussois-Souchon-Neuvesel, Paris, France, a company of France
Filed Apr. 10, 1967, Ser. No. 629,724
Claims priority, application France, Apr. 19, 1966, 58,139
Int. Cl. C03b 9/00
U.S. Cl. 65—337              1 Claim

ABSTRACT OF THE DISCLOSURE

A process and apparatus for melting glass which permits of its continuous industrial manufacture wherein following operations are performed: transferring into a vertical melting column and upwardly displacing a mass of glass in the viscid state, heating said mass during its upward motion within the column, then transferring the molten mass from the delivery end of said column to a second vertical conditioning column in order to permit of heat transfer with the melting column and causing said mass to move down to a space for the withdrawal of the glass, the transfer of the molten glass from the first column to the second column being carried out within a leak-tight communication chamber in which a partial vacuum is created and in which the upper extremities of the two columns have their openings.

---

The present invention relates to a novel process for melting glass and to the correlative industrial manufacture of vitreous products. This invention is also concerned with a device which is specially adapted to the execution of the process under consideration. For the sake of simplicity, the term "glass" as employed in the following description will serve to designate the material to be processed, although it will be understood that this term refers not only to glass proper but also to related vitreous inorganic substances.

In the processes at present in use for the continuous manufacture of glass, the furnaces employed comprise three adjacent zones. At one end of the first zone or so-called melting zone, the raw materials to be melted are fed in at a temperature in the vicinity of room temperature. In this first zone, the raw materials are melted by the flames of burners which utilize either gaseous or liquid fuel.

In the second zone or so-called refining zone which is adjacent to the melting zone, the molten mass is heated to a very high temperature in order to ensure its homogenization and in order to free the molten mass from occluded gases which are derived from chemical reactions.

In the third zone or so-called conditioning zone which is adjacent to the refining zone, the molten mass is brought back to the delivery temperature which is considerably lower than the temperature which prevails within the refining zone. The conditioning zone therefore serves essentially for the purpose of cooling and thermally homogenizing the molten mass.

In point of fact, this process of fusion and fabrication of vitreous products presents a number of disadvantages, these being mainly the following:

(a) The furnaces which are at present employed for continuous melting and manufacture of glass usually have the following characteristics:

Their horizontal dimensions (width and length) are great compared with their depth. However, the depth is not as a rule wholly negligible compared with the length, the ratio being usually higher than 1:20.

2

The temperatures within the refining zone are substantially higher than those which prevail at the ends of the furnace, namely in the melting zone and conditioning zone.

These common features are the cause of strong convection currents which cannot readily be controlled. The advantage of such convection currents for the purpose of homogenizing the molten mass is debatable. On the contrary, these currents are often the cause of rapid transfer of badly refined molten material from the melting zone towards the conditioning zone as well as the return to the melting zone of a product which has already been refined. These currents are liable in addition to bring a product which has been badly refined to the delivery or withdrawal point, with a resulting risk of degradation of the end product. Convection currents thus impair the efficiency both of the refining process itself and of the entire furnace.

(b) In order to permit of refinement, the molten mass must be heated to a temperature which is substantially higher than that which is necessary to melt the raw materials. This temperature rise results in a considerable increase in expenditure of thermal energy.

(c) In order to protect the refractory materials which constitute the walls of the furnace against excessive wear at high temperatures, it is necessary to cool the side walls of the furnace and to increase the depth of the bath with a view to protecting the bottom of the tank against the direct radiation of the flames. These two expedients are conducive to an increase in heat losses since a greater depth of the bath makes refining more difficult whereas a larger mass must be maintained at a high temperature.

(d) The succession of three zones considered is not very satisfactory for the following reasons:

The refining zone yields a substantial quantity of heat to the conditioning zone both as a result of radiation and conduction, thereby cooling the molten mass of the refining zone and producing a temperature rise of the molten mass of the conditioning zone: this is exactly contrary to the good execution of the process.

The recovery of heat extracted from the molten mass in the conditioning zone is both difficult and very inefficient. The melting zone to which the conditioning zone should yield its excess heat is separated from the conditioning zone by the hottest zone of the furnace, namely the refining zone.

(e) By reason of the large mass which is in process of manufacture and of the presence of convection currents, a change of composition takes a considerable length of time and becomes extremely costly.

The process according to the present invention has for its object to minimize and even remove the disadvantages which are attached to the usual processes of continuous glass manufacture and which have been mentioned in the foregoing. Accordingly, it has been found that it is possible to lower the refining temperature, to eliminate convection currents almost entirely, to reduce the mass of material being processed to a considerable extent in respect of an equal production rate and to recover the heat to be extracted from the molten mass so as to reduce the temperature from the refining temperature to the delivery temperature.

In accordance with the invention, the process for melting glass which permits of its continuous industrial manufacture is characterized in that it consists in transferring into a vertical column or so-called melting column and upwardly displacing a mass of glass in the viscid state, in heating said mass during its upward motion within the column, then in transferring the molten mass from the delivery end of said column to a second vertical column or so-called conditioning column in order to permit of heat transfer with the melting column and in causing said mass to move down to a space for the withdrawal of the glass, the transfer of the molten glass from the first column to the second column being carried out within a leak-tight communication chamber in which a partial vacuum is created and in which the upper extremities of the two columns have their openings.

One of the essential advantages of this process lies in the fact that it permits the practically complete elimination of convection currents of the glass within the melting and conditioning columns by virtue of an increase in temperature of the molten mass in an upward and vertical direction while obtaining at the same time enhanced thermal efficiency as a result of heat transfer processes between the column.

A number of characteristic features of the process outlined above will now be described in greater detail.

The solid raw materials which are in the molten or partially molten state are fed into the bottom of the melting column. It may prove advantageous to carry out the initial melting of the raw materials outside the melting column, at least to a partial extent, if a very large volume of gas is evolved during the chemical reactions between said raw materials. In point of fact, should this precaution not be taken, the pumping installation which is necessary for the purpose of maintaining a suitable vacuum within the communication chamber between the columns would in such a case become too large.

The circulation of the glass from the melting column to the conditioning column is made possible by the difference in hydrostatic pressure which exists at the same level between the two columns.

In particular, the melting column and the conditioning column can each be immersed in a tank containing a bath of molten glass. The value of the partial vacuum which is maintained within the communication chamber as well as the rates of filling of the tank for receiving the composition and delivery of the manufactured glass are then adjusted so that the level of the bath within the delivery tank is lower than that of the receiving tank.

Under these conditions, a communication between the tanks is thus provided by means of a siphon, the top portion of which is subjected to the partial vacuum which exists within the chamber. The difference of level in respect of a given rate of delivery is, among other factors, a function of the viscosity and the density of the molten mass.

Since the introduction of solid raw materials or the preliminary melting of these materials takes place at atmospheric pressure, the major part of the molten mass within the melting column is located above the level at which atmospheric pressure prevails. It is the partial vacuum applied within the air-tight chamber which covers the melting column which raises the molten mass above the level referred-to above. The height of the melting column must be greater than a predetermined value in order that the residence time of the molten mass within the column should be sufficient to ensure that melting proceeds to completion and that the heat transfer process with the conditioning column can take place.

The application of a partial vacuum presents a number of additional advantages. As is well known, it facilitates melting and refining of vitreous products so that, especially in a continuous manufacturing process, the melting of raw materials can therefore be carried out at a much lower temperature than is necessary in the case of fusion at atmospheric pressure. A partial vacuum is also conducive to the mechanical homogenization of the molten mass by producing an increase in the column of gas bubbles derived from occluded gases in the molten mass and from the completion of chemical reactions; the rising of the bubbles takes part in the agitation of the vitreous mass.

In order to compensate for heat losses resulting from the processing of the molten mass within the vertical columns and in particular in order to increase the temperature to a very appreciable extent within the top portions of the columns with respect to the temperature which exists at the inlet of the melting column, heating is accordingly applied within the vertical melting column. This heating process is particularly effective when it is applied in the upper portion of the melting column.

The utilization of heating in this section of the column provides a number of other advantages. In particular, heating contributes to the creation of a thermal regime which makes it possible to eliminate or at least to attenuate to a considerable extent the convection currents within the melting column. A further result which is achieved is that the viscosity is lowered at the point at which the highest vacuum is maintained, thereby affording the known advantage of improving the refining of the molten mass.

After being delivered from the melting column into the evacuated leak-tight chamber, the molten mass penetrates into the conditioning column and moves down within this latter. During the downward motion of the molten mass within this column, the hydrostatic pressure increases gradually, thereby assisting the adsorption of residual gases.

The molten material which flows down within the conditioning column moves in a direction opposite to that of the molten mass in the melting column. The utilization of a countercurrent flow between vertical columns of liquid presents appreciable advantages. In the first place, during the downward motion within the conditioning column, the molten material yields part of its heat across the walls which separate the melting column from the conditioning column. This heat transfer process corresponds to a substantial recovery of the heat which must be extracted from the refined mass in order to bring said mass from the highest temperature to the delivery temperature; this recovered heat makes it possible to obtain a given temperature at the top of the melting column with a consumption of heating energy of the melting column which can be up to five times less than that which would have been necessary if no heat transfer had taken place between the columns. In addition, countercurrent flow between the vertical columns of liquid makes it possible to attenuate to a substantial extent or even to suppress the convection currents within the conditioning column. In fact, the application of heating produces the highest temperature within the upper portion of the conditioning column. As it moves down within the conditioning column and yields heat to the molten mass within the melting column, the molten material cools and there is established a thermal regime such that the temperature drops in a uniform manner from the top downwards. Inasmuch as the density is highest at the lowest temperature, said thermal regime has the advantage of preventing the formation of convection currents. The countercurrent flow process also makes it possible practically to eliminate the convection currents within the melting column. In fact, as the molten material which is located within said column receives heat from the conditioning column, said material becomes heated again and there is thus established the same thermal regime which is conducive to the prevention of convection currents.

The delivery of the vitreous mass takes place at atmospheric pressure at the bottom of the conditioning column.

The invention is also concerned with a device for melting glass which permits of its continuous industrial manufacture. This device is characterized in that it comprises in combination at least one vertical column or so-called melting column with which is incorporated a charging device and at least one vertical column or so-called conditioning column, these two columns being separated by a wall having high thermal conductivity and being adapted to open at the upper extremities thereof into a leak-tight communication chamber which is connected to a device for creating a partial vacuum in said chamber, heating means for producing a temperature rise in an upward vertical direction within said columns, and a device for withdrawing the molten glass which is delivered from said conditioning column.

Preferably, the height of the melting column and the height of the conditioning column are at least equal to five times the smallest dimension of the horizontal cross section. The cross section of the conditioning column is not necessarily constant over its entire height. In many cases, it is preferable to ensure that the cross section is smaller at the lower end.

The melting and conditioning columns can be arranged in various relative positions. In particular, they can be coaxial, the melting column being preferably placed around the conditioning column; alternatively, they can be juxtaposed. The device can comprise in particular a melting column which has a rectangular cross section and which is located between two conditioning columns of similar cross section.

In all cases, the columns are advantageously grouped together inside a tower which is provided with an outer layer of refractory material covered with a leak-tight metallic casing. The upper portion of the tower which is connected to a vacuum pump encloses the communication chamber which is located above the column inlets.

The heating means are preferably electric and consist either of resistors placed above the vitreous mass or, better still, of electrodes or resistors immersed in the molten mass. These electrodes or resistors are advantageously formed of graphite or molybdenum.

The charging device can be constituted, for example, by a feed auger when the chemical reactions between the raw materials do not give rise to substantial evolution of gas during the melting process. In this case, the raw materials are introduced directly at the bottom of the melting column. In the other cases, the charging device can comprise a melting tank, the walls of which are constituted by refractories having very high heat resistance. As a result of the presence of a layer of unmelted raw materials, the melting of these materials, whether partial or complete, is preferably carried out by electric means constituted by immersed resistors or electrodes. It nevertheless remains possible to melt the raw materials by means of burners which utilize either liquid or gaseous fuel. The melting tank is connected to the melting column by means of a passageway.

The withdrawal means depend entirely on the subsequent forming of the manufactured product. Thus, the withdrawal can take place directly at the bottom of the conditioning column when it is necessary to produce glass fibers or rods. For the continuous manufacture of a glass strip, the lower portion of the conditioning column is advantageously connected to a delivery tank above which the drawing machine is located.

Further properties and advantages of the invention will become apparent from the description which now follows, reference being had to the accompanying drawings which are given by way of example and not in any limiting sense, and in which:

FIG. 5 is a view in part-sectional elevation taken along the line V—V of FIG. 4.

FIG. 8 is a view in elevation of the same embodiment taken along the line VIII—VIII of FIG. 7.

Figure 1:
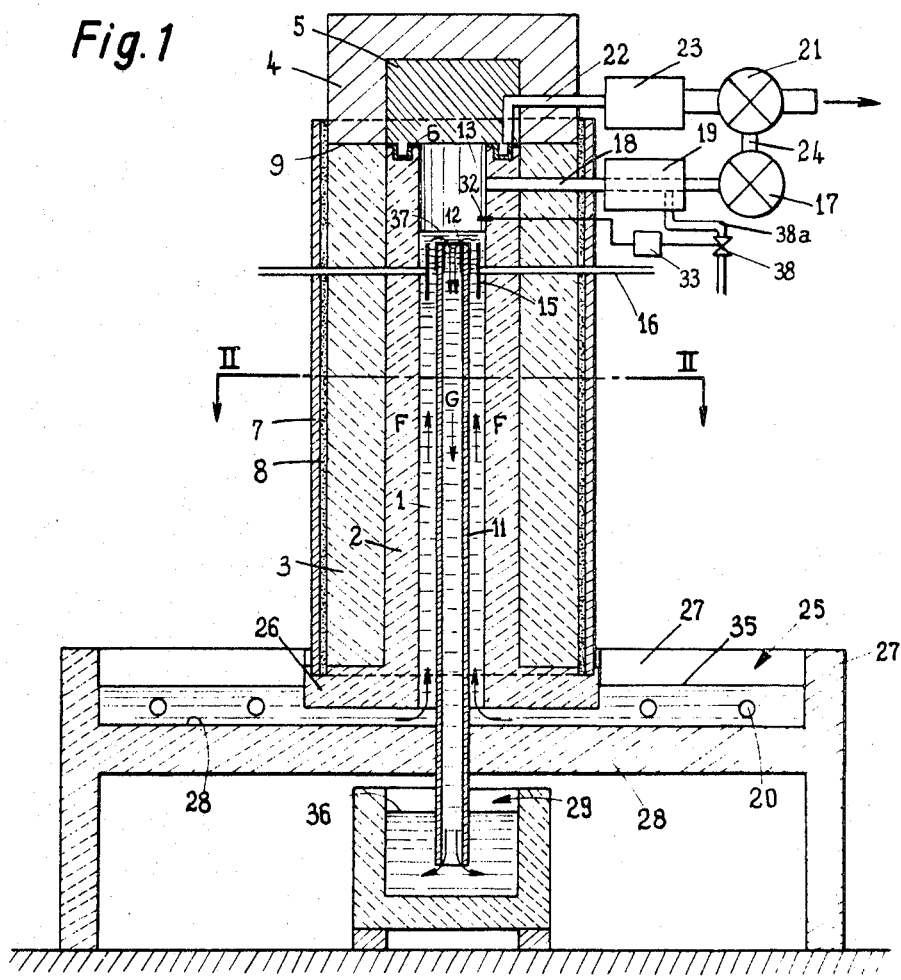
FIG. 1 is a vertical sectional view taken along the line I—I or FIG. 2 and showing a first embodiment of the device in accordance with the invention.
Figure 2:
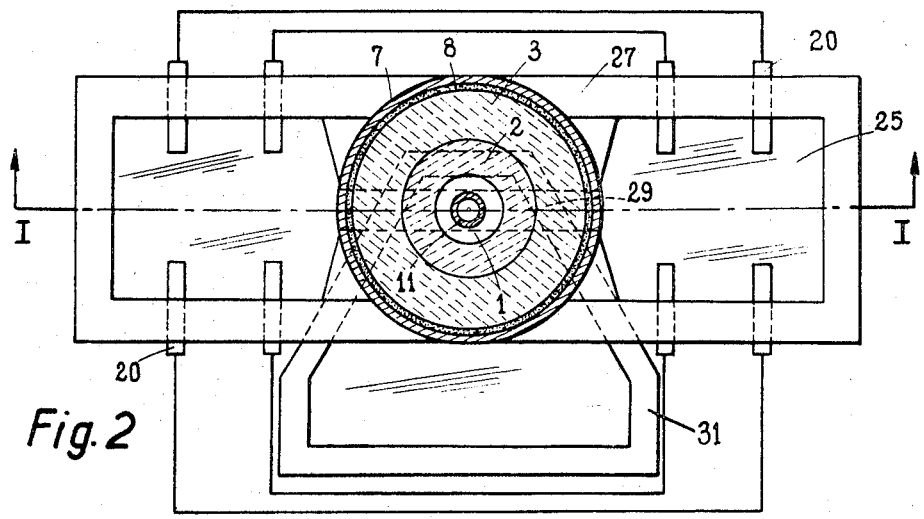
FIG. 2 is a corresponding sectional plan view taken along the line II—II of FIG. 1.

The particular embodiment of the invention which is illustrated in FIGS. 1 and 2 comprises a melting column 1 having a cylindrical volume, the cross section of which is small relative to the height and which is constituted by a tubular chamber 2 of refractory material housed within a tower 3 which is also constructed of refractory material.

The tower 3 is closed at the top by a cap 4 which covers a plug 5. Said plug is applied against the edge of the tubular chamber 2 by means of an annular trough 6 containing a viscid liquid such as molten glass, this liquid being used as a seal.

The tower 3 is housed within a leakproof metallic casing 7 with interposition of a gas-tight cement 8. The casing 7 extends beyond the level of the seal 9 which is formed between the elements 2, 3 and 4, 5.

The conditioning column 11 is disposed inside the melting column 1 and coaxially therewith. Said conditioning column is constructed by means of a tube of material having high thermal conductivity (especially of aluminous material or graphite) and a small diameter relative to its height, said tube being fitted at the top with an annular molybdenum cap 12.

The top edge of the annular cap 12 is located below the seal 9, with the result that a free space is reserved at the top of the tubular chamber 2 and constitutes a communication chamber 13 between the columns 1 and 11.

Provision is made at the top of the melting column 1 for heating means consisting of molybdenum electrodes 15 having the shape of shells which surround the top opening of the conditioning column 11. The electrodes 15 which are three in number are supplied with current through sheathed conductors 16 from a three-phase electrical power source.

Additional means are provided for producing a partial vacuum within the communication chamber 13. These means comprise a vacuum pump 17 which is connected to the chamber 13 through a pipe 18 via a cooling unit 19.

Another vacuum pump 21 is connected to the plane of the seal 9 by means of a pipe 22 via a cooling unit 23. The pipe 22 has its terminal opening in the vicinity of the trough 6. The pumps 17 and 21 are advantageously connected in cascade by means of a duct 24, and the pump 17 thus performs the function of a primary pump.

In the embodiment under consideration, the tower 3 (and its components) is mounted above a tank 25 which is intended to receive the material to be melted. The base 26 of the tower 3 is set in the edges 27 of the tank 25 and disposed parallel to the base 28 of this latter. The tank 25 additionally contains heating electrodes 20 which are disposed in oppositely facing relation and connected to a variable-voltage transformer which is not shown in the drawings.

The conditioning column 11 traverses the base 28 and has its opening in a delivery tank 29 from which the glass is withdrawn in the visco-elastic state. The tank 29 is located below the base 28 and comprises a front trough 31 which projects laterally from the tank 25 and in which the glass withdrawal proper takes place.

The equipment of the device is completed by a level detector 32 constituted by a probe which is located within the communication chamber 13 at an intermediate level between the inlet of the column 11 and the opening of the suction pipe 18. The probe 32 is connected to a servomechanism 33 which controls an air-admission electro-valve 38 located in a pipe 38a which connects the cooling unit 19 to free air. The control operation is such that the valve is opened if the bath of glass reaches the level of the probe 32.

During operation, the mean level of the glass within the different vessels is that which is shown in FIG. 1, the level 35 within the tank 25 is higher than the level 36 within the tank 29 and the top level 37 of the column of glass within the tower 3 is located between the inlet of the column 11 and the opening of the pipe 18.

The chamber 13 which is evacuated by means of the pumps 17 and 21 ensures that the column of glass is maintained within the tower 3 in such a manner that its top level 37 remains between predetermined limits.

In particular, the value of reduced pressure or partial vacuum is approximately equal to the product of the height of the column and of the density of the glass.

It is apparent that the composition which is fed into the receiving tank 25 by any suitable means is melted as it comes in contact with the bath and also as a result of the heat generated between the electrodes 20.

Taking into account the communication which is provided between the melting column 1 and the conditioning column 11 for the transfer of the glass, and taking into account also the position of the top level 37 of the glass and the difference in height between the levels 35 and 36 of the glass, there are established by siphon effect an upward circulation of the glass in the direction F within column 1 and a downward circulation in the direction G within column 11.

As it rises within column 1, the mass of molten glass or of glass in process of melting has an increasing temperature taking into account the heat which is dissipated by the electrodes 15 with respect to which the molybdenum cap 12 performs the function of a neutral-potential electrode. It is within the communication chamber 13 that the bath of glass attains its maximum temperature and consequently has its lowest viscosity. The glass then moves downwardly within the column 11. It is apparent that the countercurrent flow of the glass in directions F and G permits the hot glass of the conditioning column 11 to reheat the glass which circulates within the melting column 1 and that the temperature consequently increases within both columns from the bottom upwards, with the beneficial results which have been explained earlier.

During operation of the device, vapors are discharged from the chamber 13 by the pumps 17 and 21 which therefore not only maintain a vacuum within the chamber 13 but also effect the degassing of the mass of molten glass. If the level of the glass reaches the probe 32, the electro-valve 38 is opened and the pressure rises within the chamber 13, thereby tending to lower the level of the glass.

By way of practical example of execution of the process in accordance with the invention and so far as concerns the equipment described above, the following numerical values can be given in the case of melting and manufacture of soda-lime glass:

Height of glass within melting column—2,200 mm.
Depth of glass within charging column—250 mm.
Diameter of conditioning column—120 mm.
External diameter of melting column—220 mm.
Pressure within communication chamber—15 cm. of mercury
Temperature of glass at base of melting column—1,270° C.
Temperature of glass at top of conditioning column—1,360° C.
Rate of withdrawal of glass—22.8 kgs./hour
Power required for preliminary fusion—15 kw.
Power required for reheating—4 kw.
Specific power—0.84 kw./kg. of glass It will be readily understood that the values which have been given above, especially the last three, are given solely by way of indication and can in particular vary over a wide range.

Figure 3:
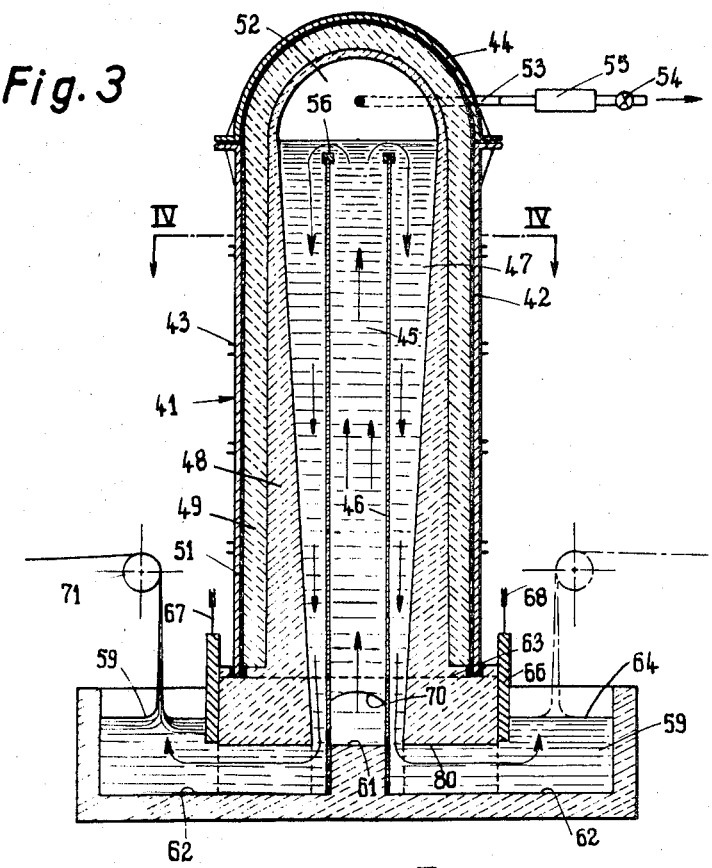
FIG. 3 is a vertical sectional view of another embodiment of the invention, this view being taken along the line III—III of FIG. 4.
Figure 4:
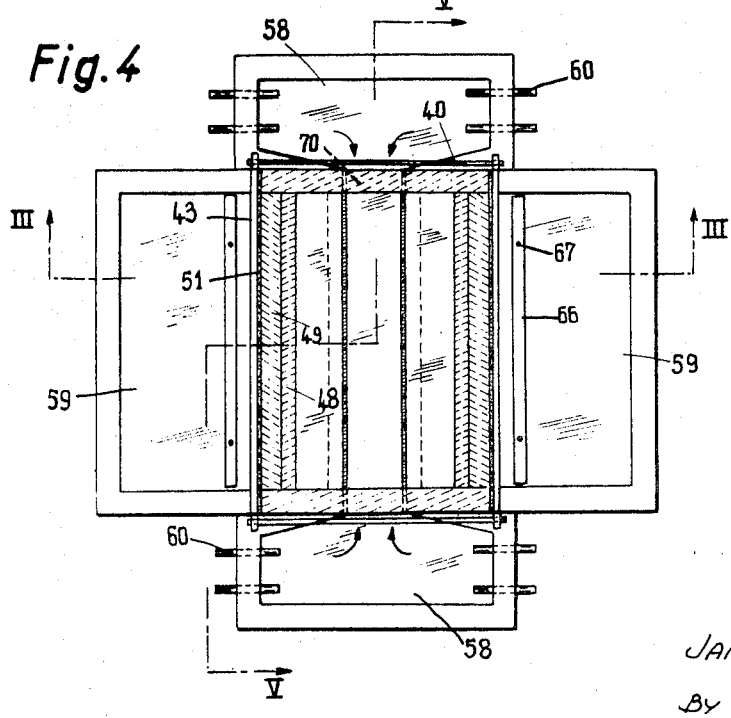
FIG. 4 is a sectional view taken along the line IV—IV of FIG. 3.

The embodiment according to FIGS. 3 to 5 is more especially intended for the manufacture of flat glass by casting or drawing.

The device again comprises a vertcial tower 41 surrounded by a leakproof casing 42 such as a metallic sheath made up of elements which are held in position by means of binding hoops 43 between which extend tie-rods 40. The tower 41 has a rectangular transverse section and is covered by a semicylindrical dome 44.

Inside the tower 41 is disposed the melting column 45 which is placed on each side of the midplane of the tower and which is separted by flat walls 46 having high thermal conducitvity from the conditioning column 47 which, in this example, is lined and located outside the column 45. The column 47 is delimited by a layer of refractory material 48, the walls of which constitute a downwardly convergent dihedron so that the cross section of the column 47 decreases from the top downwards. The layer 48 is separated from the casing 42 by an insulating layer 49 and impervious cement 51.

The upper semicylindrical volume 52 of the tower 41 constitutes a communication chamber between the columns 45 and 47. A pipe 53 has its terminal opening within said chamber and serves to connect this latter to a vacuum pump 54 through a cooling unit 55.

The heating means which are provided in the vicinity of the chamber 52 consist of graphite resistors 56 which cover the top portion of the walls 46. Said resistors 56 are supplied with current by means of conductors 57 (as shown in FIG. 5).

The columns 45 and 47 communicate respectively through the ducts 70 and 80 with two tanks, namely a tank 58 for receiving the composition to be melted and a tank 59 for withdrawing the molten glass. These tanks are disposed symmetrically with respect to the tower 41 and in two directions at right angles to each other. The base 61 of the tanks 58 (as shown in FIG. 5) is located at a level which is higher than the base 62 of the tangs 59 and the higher level 63 of the glass within the first tanks is also higher than the level 64 within the delivery tanks 59.

The receiving tanks 58 are again fitted with heating electrodes 60 for the purpose of melting the composition.

A right-angled communication is established through the ducts 80 betwen the column 47 and the delivery tanks 59. This communication is regulated by means of registers or shutters 66 which are placed at the outlet of said ducts and suspended from cables 67 which are passed around pulleys 68. These means make it possible to regulate the cross section of passage of the glass within the delivery tanks 59. In particular, said tanks can be equipped with two drawing machines, in which the bending rollers are shown diagrammatically at 71.

The operation of the device is the same as in the previous examples. The design of the tower 41 in a parallelepipedal configuration makes it possible to extend the width of the plant at will and consequently to install a number of drawing machines in the same delivery tank, should requirements so dictate.

Figure 6:
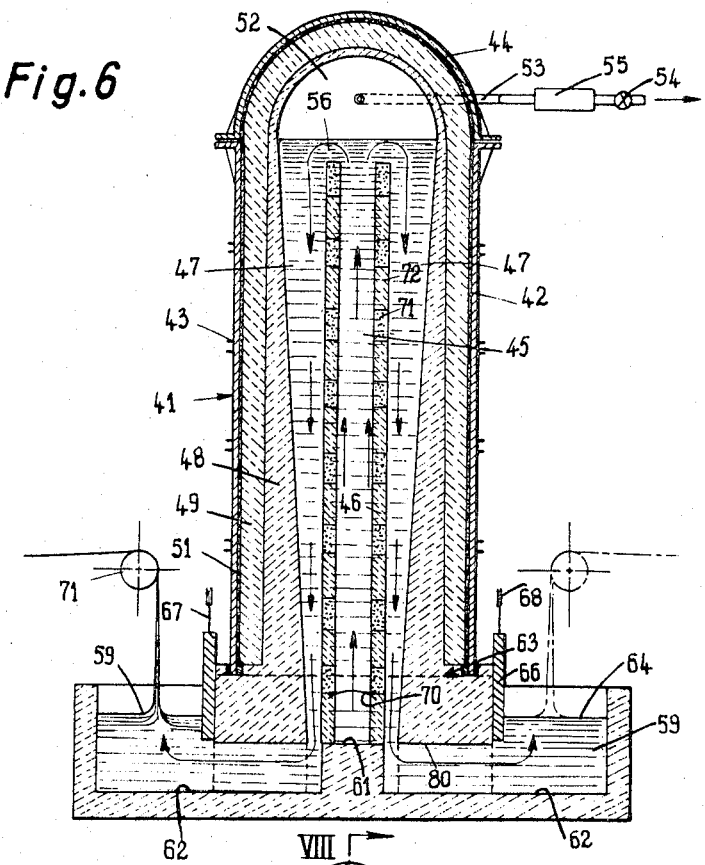
FIG. 6 is a view in sectional elevation taken through the plane of symmetry and showing an alternative embodiment of the device.
Figure 7:
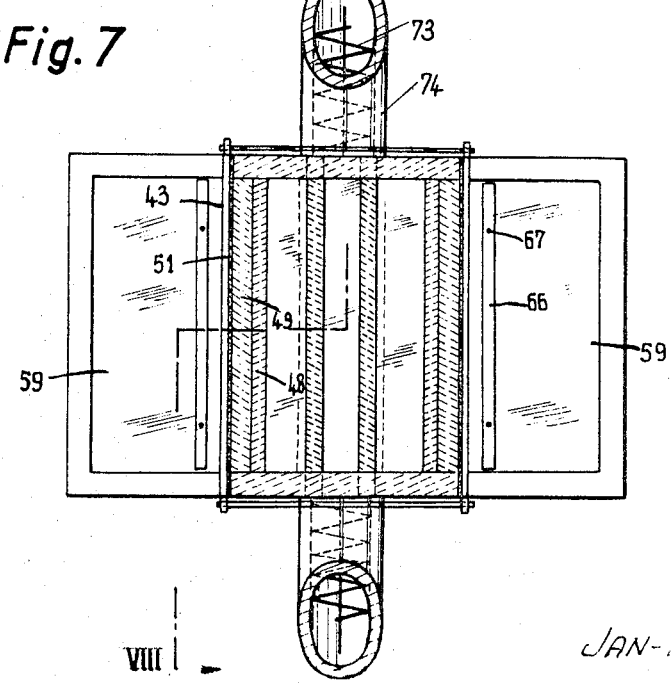
FIG. 7 is a transverse sectional view taken along the line VII—VII of FIG. 8.

The form of construction shown in FIGS. 6 to 8 is more especially intended for the fabrication of a glass which develops very little gas during the fusion process.

This device comprises a vertical tower 41 containing the melting column 45 and the conditioning column 47, this latter being double. The two columns 45, 47 are separated by walls 46 each constituted by layers 71 of refractory material and parallelepipedal graphite bars 72 arranged in alternate succession. Said graphite bars perform a quadruple function, viz:

They constitute one of the structural components of the wall,

By virtue of their high thermal conductivity, they assist the heat transfer process between the melting column 45 and the conditioning column 47.

They tend to equalize the temperature in a direction at right angles to the direction of circulation of the glass, They serve as heating electrodes. In fact, an electric current passes through each bar; voltage is applied to the ends of said bar by means of conductors 57.

The composition is charged into the melting column 45 by means of two feed augers 73 which are each housed in a casing 74, said casing being joined to the base of the melting column 45. The raw material is melted as it comes into contact with the molten glass and by means of the electric current which flows between the electrodes 72.

The operation of the device is the same as in the previous embodiment.

It is apparent that the invention is not limited to the forms of execution which have been described in the foregoing and that alternative forms can be contemplated.

In particular, the heating of the top portion of the melting column could be carried out by means of a high-frequency induction system consisting of an inductor coil disposed at the top of the tower.

I claim:

1. In apparatus for the continuous melting and refining of glass, comprising means defining a pair of vertical column means for the reception of molten glass with a partition between the two column means, said partition having a free upper edge and means defining a chamber above said free upper edge, gas outlet means for creating a partial vacuum in said chamber, means to introduce molten glass to the bottom of a first one of said column means, means for withdrawing molten glass from the bottom of the other of said column means, means inside the column means for applying heat to the glass which is adjacent said free upper edge; the improvement in which the partition is a heat-transmissive divider means, means for establishing a liquid glass level in both said column means which is above said upper edge of the partition and means maintaining a difference in hydrostatic pressure at the same level between the first and second column means, thereby to cause glass to flow from the first tank to the second tank by a syphon effect.

References Cited

UNITED STATES PATENTS

| | | | |
|---|---|---|---|
| 2,465,283 | 3/1949 | Schlehr | 65—134 XR |
| 3,019,275 | 1/1962 | Lurenz | 65—134 XR |
| 3,321,300 | 5/1967 | Worner | 65—134 XR |

FRANG W. MIGA, Primary Examiner

U.S. Cl. X.R.

13—6; 65—135, 137, 157, 335, 339, 346, 347